United States Patent [19]

Chung et al.

[11] Patent Number: 4,702,961
[45] Date of Patent: Oct. 27, 1987

[54] METHOD OF MELT PROCESSING AND ARTICLE MADE OF A STABILIZED COPOLYMER OF VINYL CHLORIDE AND CHLOROTRIFLUOROETHYLENE

[75] Inventors: Daniel C. Chung, Bridgewater; Kwang-Ho Chu, Flemington, both of N.J.

[73] Assignee: Ausimont, U.S.A., Inc., Morristown, N.J.

[21] Appl. No.: 783,813

[22] Filed: Oct. 7, 1985

Related U.S. Application Data

[63] Continuation of Ser. No. 564,598, Dec. 22, 1983, abandoned.

[51] Int. Cl.$^4$ ............................................. B32B 15/00
[52] U.S. Cl. ................................... 428/379; 428/921
[58] Field of Search ................................ 428/379, 921

[56] References Cited

U.S. PATENT DOCUMENTS 2,915,506  12/1959  Honn et al.
4,515,927   5/1985  Gaylord ............................... 526/87

FOREIGN PATENT DOCUMENTS 49-60391  6/1974  Japan.
 728557   4/1955  United Kingdom.
 840735   7/1960  United Kingdom.

OTHER PUBLICATIONS

J. Ulbricht, "Characterization and Properties of the Copolymers of Vinyl Chloride and Trifluorochloroethylene", Plaste and Kautschuk 23(7), pp. 487–490 (1976).
Ulbricht, et al., "Synthesis of Copolymers of Vinyl Chloride and Trifluorochloroethylene", Plaste and Kautschuk 22(5), pp. 390–393 (1975).
Billmeyer, "Textbook of Polymer Science", Second Edition, pp. 419–422, Wiley-Interscience (1962–1971).

*Primary Examiner*—Marion C. McCamish
*Attorney, Agent, or Firm*—John G. Gilfillan; Elliot M. Olstein; Raymond J. Lillie

[57] ABSTRACT

A method comprising the step of melt processing stabilized composition comprising a copolymer comprising from 70 to 95, and preferably 75 to 90 percent by weight of vinyl chloride and from 5 to 30 and preferably 10 to 25 percent by weight of chlorotrifuloroethylene and an effective amount of a stabilizer. The step of melt processing includes extruder processing or roll mill processing. A preferred melt processing step is melt coating the copolymer onto a substrate such as a wire. The present invention includes a substrate such as a wire melt coated with the above-described stabilized copolymer.

2 Claims, No Drawings

METHOD OF MELT PROCESSING AND ARTICLE MADE OF A STABILIZED COPOLYMER OF VINYL CHLORIDE AND CHLOROTRIFLUOROETHYLENE

This application is a continuation of application Ser. No. 564,598 filed Dec. 22, 1983, now abandoned.

BACKGROUND OF THE INVENTION

The present invention is in the field of melt processing polymers and articles made therefrom; in particular, the present invention is directed to a method of melt processing a stabilized copolymer of vinyl chloride and chlorotrifluoroethylene and an article made from such a composition.

In order to melt process polyvinyl chloride, it is necessary to add plasticizers and stabilizers. Unplasticized polyvinyl chloride is generally described as a rigid compound. In order to melt process polyvinyl chloride, a plasticizer is normally required. Polyvinyl chloride is described as being relatively unstable to heat and light. Stabilizers are typically added to improve the heat and light stability of the polymer. Typical stabilizers include the metallic salts of lead, barrium, tin, or cadmium. Oxides, hydroxides, or fatty acid salts are most effective. Reference is made to F. W. Billmeyer, Jr., *Textbook Polymer Science*, second edition, John Wiley & Sons, Inc. (1971) at pages 419 through 422.

Copolymers of vinyl chloride, and chlorotrifluoroethylene and processes to form the copolymers are described in a variety of publications and patents. A typical process and publication is Japanese Kokai No. 74 60,391 which discloses copolymers of vinyl chloride and chlorotrifluoroethylene containing from 30 to 80 percent vinyl chloride and 20 to 70 percent chlorotrifluoroethylene. The results of studies of polymers of vinyl chloride and chlorotrifluoroethylene are disclosed in J. Ulbricht and K. Raessler, *Synthesis of Copolymers of Vinyl Chloride and Trifluorochloroethylene*, Plaste Und Kautschuk 22 (5), 390–393 (1975); and J. Ulbricht, Characterization and Properties of the Copolymers of Vinyl Chloride and Trifluoroethylene, Plaste Und Kautschuk 23 (7), 487–490 (1976). These references disclose copolymers containing a wide variation of chlorotrifluoroethylene monomer and a copolymer of vinyl chloride and chlorotrifluoroethylene. In the Ulbricht article dated 1976 at page 4 it is noted that the heat stability of the vinyl chloride increases with the amount of chlorotrifluoroethylene incorporated into the copolymer. It is disclosed that the fusibility of the copolymer improves with the addition of chlorotrifluoroethylene.

SUMMARY OF THE INVENTION

The present invention is a method comprising the step of melt processing a composition comprising a copolymer comprising from 70 to 95, and preferably 75 to 90 percent by weight of vinyl chloride and from 5 to 30 and preferably 10 to 25 percent by weight of chlorotrifluoroethylene and an effective amount of a stabilizer. Preferred stabilizers include organo-metal metallic stabilizers where the metal is selected from the group consisting of Cadmium, zinc, barium, calcium and mixtures thereof. The organic compound is preferably, an oxide, hydroxide, or fatty acid salt.

Preferably, the step of melt processing is extruder processing or roll mill processing. A particularly preferred melt processing step is melt coating the copolymer onto a substrate such as a wire. The present invention includes a wire melt coated with the above-described copolymer.

DESCRIPTION OF THE PREFERRED EMBODIMENTS

The present invention is a method comprising the step of melt processing, a stabilized copolymer comprising from 70 to 95 and preferably 70 to 90 percent by weight of vinyl chloride and from 5 to 30 and preferably 10 to 25 percent by weight of chlorotrifluoroethylene. The preferred embodiments of melt processing are extruder processing, roll mill processing and melt coating the copolymer onto a substrate.

As indicated in the Background of the Invention, in order to melt process polyvinyl chloride, it is necessary to add plasticizer to the polyvinyl chloride. The addition of plasticizer presents several disadvantages. Included in these disadvantages are the fact that plasticizers are often volatile or at least diffuse to the surface of the polymer. A particular disadvantage is that the plasticizers are typically organic base compounds which reduce the fire resistance of the polymer composition and result in large amounts of smoke when the plasticized polyvinyl chloride burns. Unplasticized polyvinyl chloride does not melt drip burn, but rather chars when it burns.

Polychlorotrifluoroethylene is a melt processable compound which is extremely flame resistant. However, it is known to melt drip when it burns. A copolymer having 40 percent by weight of vinyl chloride and 60 percent by weight of chlorotrifluoroethylene melt drips when it burns.

It has been found that a stabilized copolymer which is from 70 to 95 percent by weight of vinyl chloride and 5 to 30 percent by weight chlorotrifluoroethylene is useful in a method of melt processing. The stabilized copolymer requires no plasticizer, of the type required by polyvinylchloride, to be melt processable. The copolymer has flame retardant properties such that it chars when it burns rather than melt drips. A preferred copolymer comprises from 75 to 90 percent by weight of vinyl chloride and from 10 to 25 percent by weight of chlorotrifluoroethylene. The copolymer can contain up to 10 percent of other monomers so long as the terpolymer formed chars upon burning. Such other monomers can incluce tetrafluoroethylene, vinylidene fluoride, hexafluoroisobutylene, HFP and fluorinated vinyl monomers such as those disclosed in U.S. Pat. Nos. 4,123,602 and 3,624,250 hereby incorporated by reference.

The copolymer of vinyl chloride and chlorotrifluoroethylene useful in the method of the present invention can be made by methods known to copolymerize vinyl chloride and chlorotrifluoroethylene which are known in the art. The preferred method is that disclosed in U.S. Ser. No. 474,371, filed Mar. 11, 1983, now U.S. Pat. No. 4,515,927, and hereby incorporated by reference. Briefly, vinyl chloride monomer and chlorotrifluoroethylene monomer can be copolymerized in suspension using procedures applicable to the the homopolymerization vinyl chloride and suspension and well known to those skilled in the art. According to the preferred method, a copolymer having a constant rate ratio of vinyl chloride to chlorotrifluoroethylene is formed in a reactor. The suspension copolymerization is conducted by adding an initial charge having an excess of vinyl chloride to form a copolymer having a constant weight ratio of vinyl chloride to chlorotrifluoroethylene. The chlorotrifluoroethylene and an excess of weight of vinyl chloride are added to water. A catalyst is added which causes the copolymerization to take place. The catalysts which can be used are those which are useful in the suspension polymerization of vinyl chloride. The reactor is preferably held at from 0° C. to 70° C. The vinyl chloride and chlorotrifluoroethylene copolymerize to form a copolymer having a constant weight ratio of vinyl chloride to chlorotrifluoroethylene changes.

The copolymer used in the process of the present invention can be stabilized with an effective amount of stabilizers useful to stabilize polyvinyl chloride. Such stabilizers include those referenced in the Background of the Invention as well as those listed in Modern Plastics Encyclopedia 1979–1980 Vol. 56, No. 10a, pages 696 through 710, hereby incorporated by reference. Preferred stabilizers include organo-metal metallic stabilizers where the metal is selected from the group consisting of Cadmium, zinc, barium, calcium and mixtures thereof. The organic compound is preferably, an oxide, hydroxide, or fatty acid salt.

The stabilized copolymer is melt process according to the method of the present invention. In accordance with the present invention, the copolymer is heated to above its melting temperature. Preferably, it is heated to from 170° C. to 230° C., and more preferably from 190° C. to 200° C.

The step of melt processing can be any useful method of melt processing thermoplastic materials. Typical melt processes which can be used in accordance with the method of the present invention are disclosed in Modern Plastics Encyclopedia 1979–80, Vol. 56, No. 10a, pages 247, 248, 265, 308, 332 an 381, hereby incorporated by reference. These include extrusion coating and laminating, compression molding, extrusion, lamination to form film, rotational molding and other types of molding such as injection molding. Preferred embodiments of melt processing include extruder processing, roll mill processing, and melt coating preferably by extrusion coating, and laminating. A particularly preferred use of the process of the present invention is melt coating the copolymer onto a substrate, such as a wire.

The present invention is useful to form a coated substrate, preferably a coated wire comprising a wire, and a melt coating on the wire. The melt coating comprises the stabilized copolymer as noted above which contains 70 to 95 percent by weight by vinyl chloride and 5 to 35 percent by weight of chlorotrifluoroethylene. The wire can be any wire known in the art which can be coated according to the process of the present invention. Typically, the wires are made of copper, aluminum, steel, and associated alloys. The wires can be of any thickness which can be coated. The wires can be primary wires of a coating jacket such as a plenum jacket covering a bundle of primary wires. The coating is applied by suitable melt coating technique. A preferred coating method is using an extruder to melt the copolymer and coat the wire with a cross-head die. The thickness of the coating on the wire can be as thick as can be made by known wire coating methods. Typically, primary wire is coated to a thickness of from 4–15 mils and preferably 7 to 10 mils, and plenum jacket coating thickness can range from 10 to 40 mils.

Several examples are set forth below to illustrate the nature of the invention and the manner of carrying it out. However, the invention should not be considered as being limited to details thereof.

EXAMPLES

About 400 grams of vinyl chloride chlorotrifluoroethylene copolymers was made in accordance with the procedures disclosed in U.S. Ser. No. 474,371, filed Mar. 11, 1983. The copolymer had between 15 to 20 percent by weight of chlorotrifluoroethylene and correspondingly between 80 and 85 percent of vinyl chloride.

COMPARATIVE 1

The above copolymer was heated to 195° C. The copolymer discolored immediately and became dark black char after 10 minutes.

EXAMPLE 1

One hundred grams of the above copolymer was combined with 1.5 grams of Vanstay ® HTA vinyl stabilizer which is believed to be a barium/cadmium soap and one gram of calcium stearate. This composition was extruded into a rod form by a plunger extruder at 195° C. The composition was extrudable but had poor thermostability. The composition darkened in color during the extrusion process.

EXAMPLE 2

Three hundred grams of a composition comprising 100 parts by weight of the above-recited copolymer 2.5 parts by weight of the HTA stabilizer, 1.0 parts by weight of calcium stearate, and additionally 1.5 parts by weight of Mark ® 5050 pentaerythrityl/phosphite stabilizer was added and 1.0 parts of Drapex ® 10.4 epoxy plasticizer was also used. Drapex 10.4 although called an epoxy plasticizer is used as a stabilizer in the composition of this Example. *Argus Product Data Sheet* 12/79-10.4, *Drapex* ® 10.4 hereby incorporated by reference describes Drapex 10.4 epoxy plasticizer as, "designed specifically to provide non-toxic compounds with optimum heat stabilizing action . . . ". This composition was extruded through a Haake one inch single screw extruder having an L/D ratio of 24. The extruder was operated at Zone 1-160° C., Zone 2-170° C., Zone 3-180° C. and die at 190° C. The extruder was operated at 15 to 25 rpm. The extrudate appeared to have good reological properties although it had some degradation including bubbles and poor color.

COMPARATIVE 2

Example 2 was repeated using Firestone Corp. FC-461 vinyl chloride/chlorotrifluoroethylene copolymer containing 40 percent by weight vinyl chloride and 60 percent by weight chlorotrifluoroethylene. The extrusion conditions were the same but the extruder was run as 50 to 60 rpm. The extrudate had slight degradation and bubbles but appeared to have good rheological properties.

The copolymer from Example 2 and Comparative 2 were tested in accordance with the Limiting Oxygen Index test, ASTM standard D-2863-77. This method provides for measuring of the minimum concentrations of oxygen and a flowing mixture of oxygen and nitrogen that will support flaming combustion of plastics. The measurement used is the minimum concentration of oxygen, expressed as a volume percent, and a mixture of oxygen and nitrogen that will just support combustion of a material initially at room temperature. The minimum concentration of oxygen and the mixture of oxygen and nitrogen flowing up within a test column that will just support combustion is measured under equilibrium conditions of candle-like burning. The equilibrium is established by the relation between the heat generated from the combustion of the specimen and the heat loss to the surroundings is measured by one or the other to artibrary criteria, namely a time of burning of a length of burning of the specimen burned. This point is approached from both sides of the critical oxygen concentration in order to establish the oxygen index. The copolymer used in Example 2 was found to have a limiting oxygen index of 54. It burned with low smoke and charred rather than dripped. One hundred percent of vinyl chloride has a limiting oxygen between 37 and 39. It chars upon burning. The copolymer of Comparative 2 has a limiting oxygen index of about 100 and melt drips upon burning. It is noted that when polyvinyl chloride uses a plasticizer, it smokes while it burns.

While exemplary embodiments of the invention have been described, the true scope of the invention is to be determined from the following claims:

What is claimed is:

1. A coated wire comprising a wire; and
   a melt coating on the wire comprising 70 to 95 percent by weight of vinyl chloride and 5 to 30 percent by weight of chlorotrifluoroethylene.
2. The coated wire of claim 1 wherein the copolymer chars when it burns.

* * * * *